(12) United States Patent
Sonalker

(10) Patent No.: US 11,465,614 B2
(45) Date of Patent: Oct. 11, 2022

(54) METHODS AND SYSTEMS FOR CONTROLLING USAGE OF PARKING MAPS FOR AUTONOMOUS VEHICLES

(71) Applicant: STEER-Tech, LLC, Annapolis Junction, MD (US)

(72) Inventor: Anuja Sonalker, Ellicott City, MD (US)

(73) Assignee: STEER-Tech, LLC, Annapolis Junction, MD (US)

( * ) Notice: Subject to any disclaimer, the term of this patent is extended or adjusted under 35 U.S.C. 154(b) by 0 days.

(21) Appl. No.: 17/351,740

(22) Filed: Jun. 18, 2021

(65) Prior Publication Data
US 2021/0309213 A1 Oct. 7, 2021

Related U.S. Application Data

(63) Continuation-in-part of application No. 16/242,102, filed on Jan. 8, 2019.

(60) Provisional application No. 62/614,847, filed on Jan. 8, 2018.

(51) Int. Cl.
*B60W 30/06* (2006.01)
*B60W 60/00* (2020.01)
*G08G 1/14* (2006.01)

(52) U.S. Cl.
CPC .......... *B60W 30/06* (2013.01); *B60W 60/001* (2020.02); *G08G 1/141* (2013.01); *B60W 2420/42* (2013.01)

(58) Field of Classification Search
CPC .............. B60W 30/06; B60W 60/001; B60W 2420/42; B60W 2556/40; B60W 60/0025; G08G 1/14; G08G 1/141; G08G 1/146; G06V 20/586; G06Q 2240/00; G06Q 50/30; B62D 15/0285

See application file for complete search history.

(56) References Cited

U.S. PATENT DOCUMENTS

| | | |
|---|---|---|
| 10,106,153 B1 | 10/2018 | Xiao et al. |
| 10,663,303 B2 | 5/2020 | Lawrenson et al. |
| 10,816,346 B2 | 10/2020 | Wheeler et al. |
| 10,942,516 B2 | 3/2021 | Rastoll et al. |
| 10,999,719 B1 | 5/2021 | Kaplan |
| 2018/0188036 A1 | 7/2018 | Hasberg et al. |

(Continued)

FOREIGN PATENT DOCUMENTS

JP 2016139436 A * 8/2016 ......... G06Q 30/0205

OTHER PUBLICATIONS

English_Translation_for_reference_JP2016139436A.*

(Continued)

*Primary Examiner* — Rachid Bendidi
(74) *Attorney, Agent, or Firm* — Caldwell Intellectual Property Law, LLC

(57) ABSTRACT

Aspects relate to methods and systems for controlling usage of parking maps for autonomous parking. In some embodiments, an exemplary system includes a computing device, configured to receive a first parking map representative of a first point of interest, wherein the first parking map comprises a first access datum, generate a first map metric associated with the first parking map, and selectively communicate the first parking map with a first remote device as a function of the first access datum.

12 Claims, 5 Drawing Sheets

(56) References Cited

U.S. PATENT DOCUMENTS

| | | | |
|---|---|---|---|
| 2018/0373249 A1* | 12/2018 | Choi | G01C 21/3667 |
| 2019/0063947 A1* | 2/2019 | Beaurepaire | G01C 21/3685 |
| 2019/0137287 A1 | 5/2019 | Pazhayampallil et al. | |
| 2019/0147331 A1 | 5/2019 | Arditi | |
| 2020/0034620 A1 | 1/2020 | Lutterodt | |

OTHER PUBLICATIONS

NVIDIA, End-to-End HD Mapping for Self-Driving Cars, May 24, 2021.

Tong Qin, Tongqing Chen, Yilun Chen, Qing Su, AVP-SLAM: Semantic Visual Mapping and Localization for Autonomous Vehicles in the Parking Lot, Jul. 8, 2020.

* cited by examiner

METHODS AND SYSTEMS FOR CONTROLLING USAGE OF PARKING MAPS FOR AUTONOMOUS VEHICLES

CROSS-REFERENCE TO RELATED APPLICATIONS

This application is a continuation-in-part of Non-provisional application Ser. No. 16/242,102 filed on Jan. 8, 2019, and entitled "AUTOMATED VALET SYSTEM," the entirety of which is incorporated herein by reference, and which claims the benefit of priority of U.S. Provisional Patent Application Ser. No. 62/614,847, filed on Jan. 8, 2018, and titled "AUTOMATED VALET SYSTEM," which is incorporated by reference herein in its entirety.

FIELD OF THE INVENTION

The present invention generally relates to the field of computerized vehicle controls. In particular, the present invention is directed to methods and systems for mapping a parking area for autonomous parking.

BACKGROUND

Currently many automakers make vehicles which may operate with some level of automation. However, the public has yet benefit in large measure from this technological leap. A lot of discomfort exists around the possibility of allowing automatically driven vehicles to take over all driving tasks; and indeed it appears many driving circumstances arise that baffle the automated systems of current self-driving vehicles, for instance poorly labeled and crowded city streets.

SUMMARY OF THE DISCLOSURE

In an aspect a method of controlling usage of parking maps for autonomous parking includes receiving, using a computing device, a first parking map representative of a first point of interest, wherein the first parking map comprises a first access datum, generating, using the computing device, a first map metric associated with the first parking map, and selectively communicating, using the computing device, the first parking map with a first remote device as a function of the first access datum.

In another aspect a system for controlling usage of parking maps for autonomous parking includes a computing device, configured to receive a first parking map representative of a first point of interest, wherein the first parking map comprises a first access datum, generate a first map metric associated with the first parking map, and selectively communicate the first parking map with a first remote device as a function of the first access datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for controlling usage of parking maps for autonomous vehicles. In an embodiment, a parking map representative of a point of interest is selectively communicated to an autonomous vehicle, so that the autonomous vehicle may automatically park and summon at the point of interest.

Aspects of the present disclosure can be used to allow the public to benefit today from self-driving car technology by having their current vehicle drop them off and pick them up at points of interest which are mapped specifically to allow for this purpose. Aspects of the present disclosure can also be used to allow a point of interest to offer automatic valet services for those who visit the point of interest. This is so, at least in part, because the current disclosure describes systems and methods which can be used with substantially any point of interest, for example a point of interest having access to any ordinary parking lot or parking garage. Furthermore, this is so, at least in part, because mapping and usage of parking maps may be access controlled. For example, at a private point of interest, such as a residence, a parking map may be generated with an access datum indicating private usage of the parking map only by certain user's and/or autonomous vehicles. Alternatively, a public point of interest may have a parking map with an access datum indicating public usage of the parking map at the public point of interest.

Aspects of the present disclosure allow for controlled usage of parking maps for automatic parking. Exemplary embodiments illustrating aspects of the present disclosure are described below in the context of several specific examples.

Figure 1:
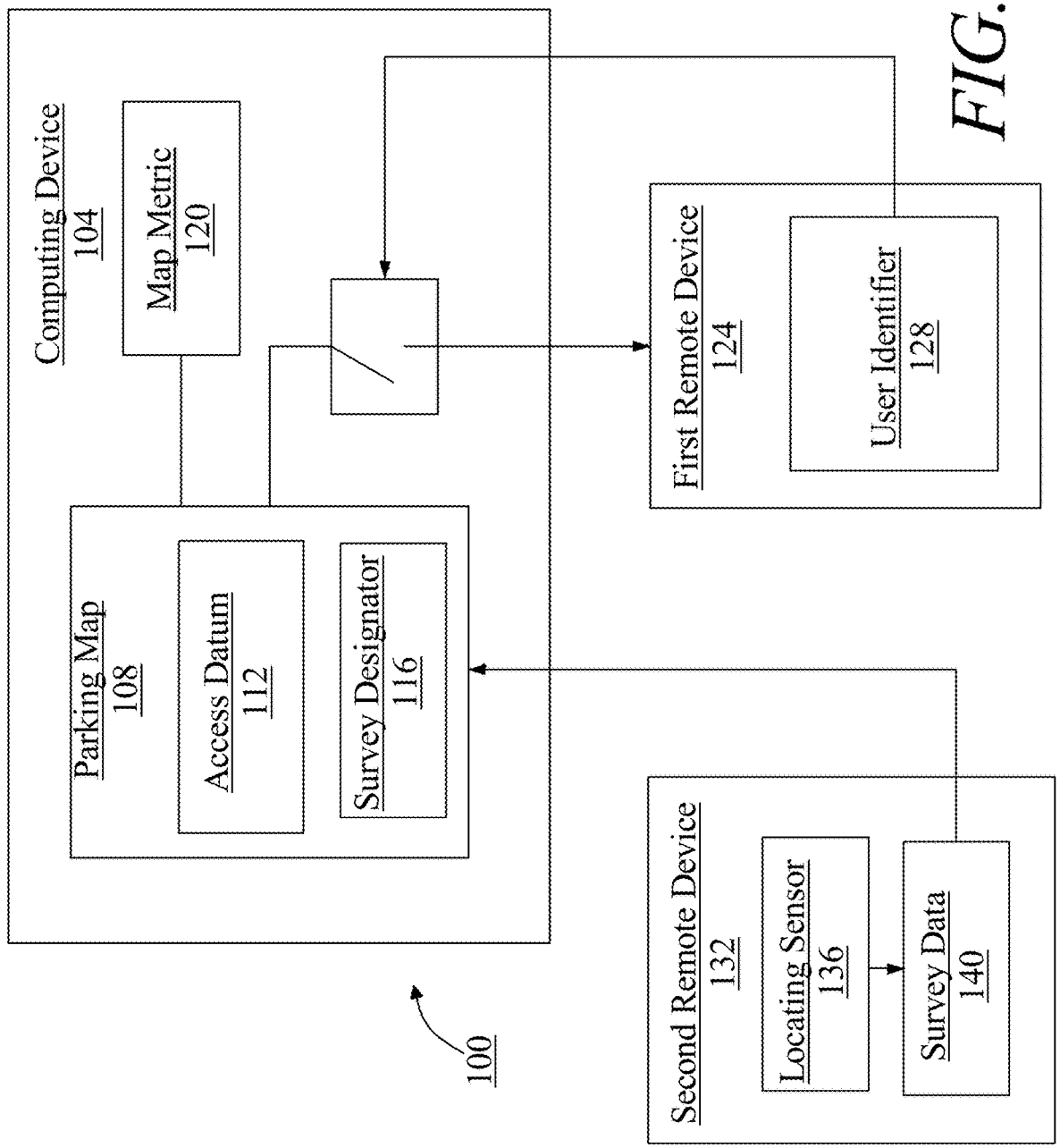
FIG. 1 is a block diagram illustrating an exemplary system for controlling usage of parking maps for autonomous vehicles.

Referring now to FIG. 1, an exemplary embodiment of a system 100 for controlling usage of parking maps for autonomous parking is illustrated. As used in this disclosure, "mapping" is a process of generating a symbolic representation, i.e., a map, of a geographic location, for example without limitation a parking lot and surrounding areas. Mapping may include generation of machine and/or human readable maps. In some cases, mapping may be performed with requisite specificity that it may be understood as world modeling. As used in this disclosure, "world modeling" is a process of generating a machine-readable model of a world surrounding a device, such that the device is able to function autonomously by using at least in part the model. As used in this disclosure, "autonomous" is an attributive term referring to an ability of a device, i.e., machine, to function without human intervention. The society of Automotive Engineers (SAE) has defined six different levels (0-5) to categorize the type of automation a vehicle may be configured to perform. Levels 0-3 all require a driver and cannot travel from a first point to a second point without any human interaction during the trip. Level 4 vehicles are configured to perform all safety critical driving functions and monitor roadway conditions for an entire trip between a first point and a second point without any human interaction during the trip. However, level 4 vehicles are limited according to their corresponding operational design domain (ODD). Level 5 vehicles may perform all driving tasks under any conditions. The SAE levels for automated vehicles have been adopted by various entities including the National Highway Traffic Safety Administration. As used in this disclosure, an "autonomous vehicle" is fully autonomous and able to drive without human oversight; for example, in some cases, an autonomous vehicle may operate at a SAE automation level of 4. In some cases, an autonomous vehicle may operate without a human present within the vehicle.

With continued reference to FIG. 1, system includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may be configured to receive a parking map 108. As used in this disclosure, a "parking map" is a map associated with a point of interest. As used in this disclosure, a "point of interest" is geographic location, area, or point, to which a car may, generally speaking, be driven; for instance, a shop in a mall may be considered a point of interest, according to this disclosure, even though one would not drive their car into the mall to get to the shop but would instead park near the mall and walk to the shop. A parking map 108 may be used by an autonomous vehicle to drive (e.g., park and/or be summoned) autonomously, for instance at a point of interest associated with the parking map 108. As described in greater detail below, a parking map 108 may include location data and corresponding designation data requisite to allow for automatic parking of an autonomous vehicle at a point of interest. For example, in some cases, a parking map 108 may include representations of one or more of geofences, waypoints, and or waypaths as well as designations indicating required information, such as parking location, pick-up location, drop-off location, and the like.

With continued reference to FIG. 1, parking map 108 may include an access datum 112. As used in this disclosure, an "access datum" is at least an element of data that represents accessibility of a parking map. For example, in some cases, an access datum may indicate that a parking map is privately accessible, for example only to one user. Alternatively or additionally, in some cases, an access datum may indicate that a parking map is publicly accessible; for example, the parking map is widely accessible publicly to large audience. In still more cases, an access datum may indicate that a parking map is shared, for example, shared between a group of users. In some cases, a shared parking map may be able to be used by a plurality of users, such as without limitation at least a group of users, but the shared parking map is still not publicly accessible.

Still referring to FIG. 1, in some embodiments, parking map 108 may include at least a permission datum. In some cases, permission datum indicates which user and/or a group of users have permission to read (e.g., view), write (e.g., modify and/or survey), and/or access (e.g., access datum 112) a parking map depending upon the permission datum. In some cases, parking map 108 may include at least an owner datum. An owner datum may indicate which user "owns" or controls parking map 108. In some cases, a user who maps, such as a surveyor, parking map 108 may be indicated as the parking map 108 owner. Alternatively and/or additionally, in some cases, another user may be indicated as owner of a parking map 108. In some other embodiments, substantially one user, a superuser, or no user may own substantially all parking maps 108. In some cases, only a parking map owner may access, edit, modify, and/or delete parking map 108 and/or access datum 112. In some cases parking map 108 may additionally include a group datum. In some cases, a group datum may indicate what group, for example what group of users, is associated with parking map 108. In some cases, a user belonging to parking map 108 group may be able to access, edit, modify, and/or delete parking map.

Still referring to FIG. 1, in some embodiments, computing device 104 may be further configured to store parking map 108 on a map datastore. As used in this disclosure, a "map datastore" is a location, virtual, digital, and/or physical, within which a parking map is stored. Non-limiting exemplary map datastores include databases, database tables, filesystems, and the like. An exemplary database which in some embodiments may be used as a map datastore is NOSQL. In some cases, a different map datastore will be used to store parking maps 108 according to their access datum 112. For example, in some cases, all publicly accessible parking maps may be stored on substantially the same map datastore. Likewise, private parking maps may be stored on one or more private map datastores. In some cases, map datastore may correspond to one or more of access datum 112, permission datum, owner datum, and/or group datum.

With continued reference to FIG. 1, parking map 108 may include at least a survey designator 116. As used in this disclosure, a "survey designator" is a designator or label associated with a point of interest. For example without limitation, at least a survey designator 116 may include one or more of a point of interest designator, drop-off location designator, parking location designator, parking path designator, pick-up location designator, and summoning path designator. As used in this disclosure, a "point of interest designator" is at least an element of data that symbolizes a point of interest. Non-limiting examples of point of interest (POI) designators include a POI name, a POI identification (i.e., serial) number, a POI positional coordinates, a POI descriptor, a POI characteristic, and the like. At least a survey designator 116 may include a drop-off location designator for a drop-off location associated with point of interest. As used in this disclosure, a "drop-off location" is a geographic location, area, or point, where an autonomous vehicle may be driven to and dropped off for automatic parking. In some embodiments, autonomous vehicle may be dropped off at a drop-off location and the autonomous vehicle may automatically park itself from the drop-off location without intervention from a human driver. The term "drop-off" may be considered as relating to a passenger (and/or driver) of autonomous vehicle being dropped off, for example at a point of interest; alternatively or additionally, "drop off" may be considered to relate to the autonomous vehicle itself being dropped off, for example for automatic parking. As used in this disclosure, a "drop-off location designator" is at least an element of data that symbolizes a drop-off location. Non-limiting examples of drop-off location designators include a drop-off location name, a drop-off location identification (i.e., serial) number, a drop-off location positional coordinates, a drop-off location descriptor, a drop-off location characteristic, and the like.

With continued reference to FIG. 1, in some embodiments, at least a survey designator 116 may include a parking location designator for a parking location associated with point of interest. As used in this disclosure, a "parking location" is a geographic location, area, or point where an autonomous vehicle may automatically park. Non-limiting examples of parking locations include parking lots, parking garages, on-street parking, temporary parking areas (e.g., fields, closed roads, and the like), driveways, garages, and the like. As used in this disclosure, a "parking location designator" is at least an element of data that symbolizes a parking location. Non-limiting examples of parking location designators include a parking location name, a parking location identification (i.e., serial) number, a parking location positional coordinates, a parking location descriptor, a parking location characteristic, and the like.

With continued reference to FIG. 1, in some embodiments, at least a survey designator 116 may include a parking path designator for a parking path between drop-off location and parking location. As used in this disclosure, a "parking path" is a path an autonomous vehicle takes from a drop-off location to a parking location. A parking path may include, without limitation roads, highways, driveways, parking lots, parking garages, and the like. As used in this disclosure, a "parking path designator" is at least an element of data that symbolizes a parking path. Non-limiting examples of parking path designators include a parking path name, a parking path identification (i.e., serial) number, a parking path positional coordinates, a parking path descriptor, a parking path characteristic, and the like.

With continued reference to FIG. 1, in some embodiments, at least a survey designator 116 may include a pick-up location designator for a pick-up location associated with point of interest. As used in this disclosure, a "pick-up location" is a geographic location, area, or point, where an autonomous vehicle may drive to and pick up a user. In some embodiments, autonomous vehicle may autonomously drive, without intervention from a human driver to a pick-up location and the human driver may pick-up the autonomous vehicle at the pick-up location. The term "pick up" may be considered as relating to a passenger (and/or driver) of autonomous vehicle being picked up, for example at a point of interest after the autonomous vehicle has been summoned; alternatively or additionally, "pick up" may be considered to relate to the autonomous vehicle itself being picked up, for example from automatic parking. As used in this disclosure, a "pick-up location designator" is at least an element of data that symbolizes a pick-up location. Non-limiting examples of pick-up location designators include a pick-up location name, a pick-up location identification (i.e., serial) number, a pick-up location positional coordinates, a pick-up location descriptor, a pick-up location characteristic, and the like.

With continued reference to FIG. 1, in some embodiments, at least a survey designator may include a summoning path designator for a summoning path between parking location and pick-up location. As used in this disclosure, a "summoning path" is a path an autonomous vehicle takes from a parking location to a pick-up location. A summoning path may include, without limitation roads, highways, driveways, parking lots, parking garages, and the like. As used in this disclosure, a "summoning path designator" is at least an element of data that symbolizes a summoning path. Non-limiting examples of summoning path designators include a summoning path name, a summoning path identification (i.e., serial) number, a summoning path positional coordinates, a summoning path descriptor, a summoning path characteristic, and the like.

With continued reference to FIG. 1, computing device may generate a first map metric 120 associated with first parking map 108. As used in this disclosure, a "map metric" is a quantifiable measure representative of a parking map's suitability for a specific or general purpose. For example, in some cases, a map metric may be representative of an aggregation of user feedback of the parking map. Alternatively or additionally, in some cases, a map metric may be representative of utilization of a parking map; for example, as a measure of how regularly the parking map is used. In some cases, a map metric representing utilization of a parking map may be normalized and/or standardized according to statistical analysis methods and/or known traffic and/or global parking map utilization metrics. In some cases, a map metric may be representative of number and/or proportion of autonomous parking failures and/or successes resulting from success of a parking map.

Still referring to FIG. 1, in some embodiments, computing device 104 may be additionally configured to receive a user feedback associated with parking map 108. As used in this disclosure, a "user feedback" is any element of data originating from a user, for instance related to an individual parking map and/or a surveyor. In some cases, a user feedback may include a ranking, for example a number of 1 through 5-star ranking. In some cases, a user feedback may include unstructured data, for example in a form such as a text or audio user review. In some cases, user feedback including unstructured data may be processed using one or more of natural language processing algorithms and/or supervised or unsupervised machine-learning processes to categorize and or score the user feedback, such that it may be incorporated into a metric, such as a map metric or a surveyor metric. In some cases, a user feedback may include a binary or categorical designation, for example a "like" or a "dislike" indication. In some cases, computing device 104 may be configured to update map metric 120 as a function of user feedback. In some cases, one or more algorithms or calculations may be used to generate and/or update map metric. For example, in some cases, data of different types (e.g., map usage and user feedback) may be aggregated and represented by map metric. Aggregation may include any known mathematical method of aggregation, including normalizing, addition, multiplication, exponential relationships, and the like. In some cases, data of different types is weighted according to different weights. Weights may represent a relative measure of importance for a particular data and/or data type represented by map metric. In some cases, weights may be determined by a programmer or another expert user or designer. Alternatively or additionally, in some cases, determination of weight of different data and/or data types may be performed by using one or more machine-learning algorithms. In some cases, at least a machine-learning process, for example a machine-learning model, may be used to generate and/or update map metric 120 by computing device 104. Computing device 104 may use any machine-learning process described in this disclosure for this or any other function.

With continued reference to FIG. 1, computing device 104 may selectively communicate parking map 108 with a first remote device 124. As used in this disclosure, a "remote device" is a computing device that is remote to the computing device 104; remote device may be geographically remote, i.e., located in a different place, to computing device and/or remote device may be cybernetically remote, i.e., located on a different network, than the computing device. Remote device 108 may be communicative (or said another way communicatively connected) with computing device 104. For example, a remote device may be connected to computing device 104 by way of one or more networks. Non-limiting examples of networks include Ethernet, Internet, local area networks, wide area networks, wireless networks, cellular networks, and the like. In some cases, remote device, such as without limitation first remote device 124, may include an autonomous vehicle.

With continued reference to FIG. 1, computing device 104 may selectively communicate parking map 108 to first remote device 124. As used in this disclosure, "selectively communicate" is a process of conditional communication. In some cases, parking map 108 may be selectively communicated to first remote device 124 as a function of first access datum 112. For example, if access datum 112 indicates that parking map 108 is intended for public accessibility, then the parking map 108, in some cases, may be communicated to substantially any remote device requesting the parking map 108. Alternatively, if access datum 112 indicates that access to parking map 108 is to be limited to one or more individual users and/or remote devices, computing device 104 may first ensure that a requesting remote device or user has access to the parking map 108 prior to selectively communicating the parking map 108.

With continued reference to FIG. 1, in some cases, computing device 108 may selectively communicate parking map 108 as a function of one or more permission datum, owner datum, and/or group datum. In some embodiments, access control may include one or more of authentication, authorization, and audit. In some cases, access control may substantially include only access approval, for example without limitation whereby computing device 104 may make a decision to grant or reject an access to a parking map 108 from an already authenticated user, based on what the user is authorized to access, for example as indicated by an access datum. Authentication and access control in some cases may be combined into a single operation, so that access is approved based on successful authentication, or based on an anonymous access token. Authentication methods and tokens may include passwords, biometric analysis, physical keys, electronic keys and devices, hidden paths, social barriers, and monitoring by humans and automated systems. According to some embodiments of an access control methods, entities that can perform actions on the system may be referred to as subjects (e.g., user) and entities representing resources to which access may need to be controlled may be referred to as objects (e.g., parking map 108). Subjects and objects, in some cases, may both be represented within software, rather than as human users. This is the case as typically any human users can only have an effect on the system via the software entities that they control. In some cases, software may represent a subject according to a descriptor, such as a user identifier 128. In this case, substantially all processes started by a user, by default, may have the same authority, permission, and/or access.

With continued reference to FIG. 1, computing device 104 may selectively communicate parking map 108 by using one or more access control methods. As used in this disclosure, "access control" is the selective restriction of access to a resource, for example a parking map 108.

Still referring to FIG. 1, in some embodiments, first remote device 124 may be configured to communicate a user identifier 128 associated with a user of the first remote device 124 to computing device 104. As used in this disclosure, a "user identifier" is at least an element of data that uniquely represents a user, such that substantially one user identifier represent one user and one user is represented by one user identifier. Exemplary non-limiting user identifiers include usernames, codes, numbers, for example driver's license numbers and/or serial numbers, and the like. In some cases, a user identifier may include a surveyor identifier. In some cases, computing device 104 may be configured to authenticate a user of first remote device 124. In some cases, computing device 104 may be configured to authenticate a user as a function of a user identifier 128. As used in this disclosure, "authenticating" is the act of proving an assertion, such as an identity of a computing device and/or a user. In some cases, authentication may include verifying a user's driver's license number.

Still referring to FIG. 1, in some embodiments, in some cases, authentication of a user and/or a computing device may include authentication methods from three categories, based on authentication factor: (1) something the user and/or the computing device knows, (2) something the user and/or the computing device has, and (3) something the user and/or the computing device is. Each authentication factor covers a range of elements used to authenticate or verify a user's and/or computing device's identity prior to being granted access to a parking map 108. In some cases, authentication may include methods using at least one authentication factor. Authentication factors may include knowledge factor, ownership factor, and/or inference factor. Knowledge factors, something user and/or computing device knows, may include one or more of a password, partial password, pass phrase, personal identification number (PIN), challenge response (i.e., user must answer a question or pattern), security question, and the like. Ownership factors, something user and/or computing device has, may include wrist band, ID card, security token, implanted device, cell phone with built-in hardware token, software token, cell phone holding a software token, and the like. Inference factors, something user and/or computing device is or does, may include fingerprint, retinal pattern, DNA sequence, signature, face, voice, unique bio-electric signals, other biometric identifier, and the like. In some cases, authentication may include single-factor authentication. As the name implies, single factor authentication uses only one factor to authenticate user and/or computing device. Likewise, multi-factor authentication involves two or more authentication factors. Two-factor authentication is a special case of multi-factor authentication involving exactly two factors.

Still referring to FIG. 1, in some embodiments, one or more other parking maps 108 may be considered and selectively communicated to first remote device 124. For example in some cases, computing device 104 may receive a second parking map representative of the same point of interest as parking map 108. In some cases, second parking map may include a second access datum. In some cases, computing device 104 may generate a second map metric associated with second parking map. Computing device 104 may selectively communicate one of parking map 108 and second parking map as a function of the access datum 112, second access datum, and/or user identifier 128. For example, in some cases, user identifier 128 may have access (according to access datum 112) to one, both, or none of parking map 108 and second parking map.

Still referring to FIG. 1, in some embodiments, one or more other conditional criteria may be considered as in selectively communicating parking map 108. In some cases, computing device 104 may be configured to generate a parking map list including a parking map 108 and a second parking map. As used in this disclosure, a "parking map list" is an enumeration of parking maps. In some cases, a parking map list may include a plurality of parking maps all representative of a single point of interest. In some cases, a parking map list may include a plurality of parking maps representative of a plurality of points of interest. In some cases, computing device 104 may rank, sort, or otherwise order parking maps within parking map list as a function of map metric 120 and a second map metric associated with second parking map. As used in this disclosure, a "ranking" is a relationship between a set of items such that, for any two items, the first is either "ranked higher than", "ranked lower than" or "ranked equal to" the second. In some cases, a ranking may be understood as a weak order or total preorder of objects. In some cases, a ranking, for example a ranking of a parking map list, may not necessarily be a total order of objects, as two different objects may have the same ranking. In some embodiments, if two items, for example parking maps, have the same rank it is considered a tie. In some cases, a ranking may allow detailed measures, such as map metric, to be reduced to a sequence of ordinal numbers; rankings, therefore, may make it possible to evaluate complex information according to certain criteria.

In some cases, ranking a parking map list may include statistical ranking. Statistical ranking may include one or more data transformation in which numerical or ordinal values are replaced by their rank when the data are sorted. For example, the numerical data 3.4, 5.1, 2.6, 7.3 are observed, the ranks of these data items would be 2, 3, 1, and 4, respectively. For example, the ordinal data hot, cold, warm would be replaced by 3, 1, 2. In these examples, the ranks are assigned to values in ascending order. In some cases, ranking parking map list may include rearranged the parking map list into an ascending or a descending order. In some cases, one or more statistical calculations may be employed prior to, during, and/or after ranking parking map list. Non-limiting exemplary calculations include Friedman test, Kruskal-Wallis test, Rank products, Spearman's rank correlation coefficient, Wilcoxon rank-sum test, Wilcoxon signed-rank test, Van der Waerden test, and the like.

In some cases, at least a machine-learning process, for example a machine-learning model, may be used to rank parking map list by computing device 104. Computing device 104 may use any machine-learning process described in this disclosure for this or any other function. In some cases, computing device 104 may selectively communicate one of parking map 108 and second parking map as a function of parking map list.

Still referring to FIG. 1, in some embodiments, computing device 104 may be further configured to receive a third parking map representative of a second point of interest. In some cases. second point of interest may be at a substantially different location than any other point of interest. In some cases, computing device 104 may be configured to selectively communicate third parking map with first remote device 124 as a function of a location of the first remote device 124. In some cases, a location of first remote device 124 is known. For example, location of first remote device 124 may be input by a user; and/or location of the first remote device 124 may be determined by at least a location sensor in communication with the first remote device 124. In some cases, location of first remote device 124 may be compared with a location of parking map 108; and parking map 108 may be selectively communicated wot first remote device 124 only if the location of first remote device 124 and the location of parking map 108 a substantially similar or within a certain distance of one another (e.g., less than 10 miles, less than 1 miles, less than 0.5 miles, or less than 0.1 miles). In some case, location of first remote device 124 may be an anticipated and/or planned future location of the first remote device 124, i.e., the first device 124 may not be presented at the location of the first remote device 124. Instead, in some cases, location of first remote device 124 may be a hypothetical, planned, or possible location of first remote device 124.

Still referring to FIG. 1, in some embodiments, computing device 104 may be configured to receive parking map 108 according to a mapping process. For example, computing device may receive at least a survey designator 116 for point of interest. In some cases, a user may input survey designators into computing device 104 directly or by way of another computing device in communication with the computing device 104. Alternatively and/or additionally, a remote device may communicate at least a survey designator 116 to computing device 104. In some cases, a user may input at least a survey designator 116 into remote device. In some embodiments, system 100 may additionally include a second remote device 132. In some cases, second remote device may include at least a locating sensor 136. Second remote device 132 may include or otherwise be communicative with a locating sensor 136. As used in this disclosure, a "locating sensor" may be any sensor or plurality of sensors that can be used to detect information useful for determining a location of the sensor. Non-limiting examples of locating sensors include a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. Second remote device 132 and locating sensor 136 may be configured to survey point of interest. As used in this disclosure, "surveying" is an act of measuring and recording with a certain level of precision a geographic location, area, or point. In some embodiments, aspects of the present invention may allow non-expert users to survey a point of interest and/or geographic locations associated with a point of interest with a certain level of precision, without need for extensive training. In some embodiments, second remote device 132 may include a remote computing device and at least a locating sensor 136 communicatively connected to the remote computing device. In some cases, at least a locating sensor 136 comprises a global positioning sensor.

Still referring to FIG. 1, in some embodiments, second remote device 132 may be configured to survey point of interest. In some cases, surveying point of interest may additionally include surveying at least a portion of point of interest; recording survey data for the at least a portion of the point of interest; and uploading the survey data to computing device 104. As used in this disclosure, "survey data" is information recorded during or otherwise associated with a survey of a point of interest. In some cases, survey data 140 may include one or more of a geofence, a waypoint, and/or a waypath. In some cases, second remote device 132 and locating sensor 136 may be configured to survey a drop-off geofence for drop-off location. As used in this disclosure, a "drop-off geofence" is at least an element of data that represents a positional boundary of a drop-off location to a certain level of precision. Second remote device 132 and locating sensor 136 may be configured to survey a parking geofence for parking location. As used in this disclosure, a "parking geofence" is at least an element of data that represents a positional boundary of a parking location to a certain level of precision. Second remote device 132 and locating sensor 136 may be configured to record a parking waypath for parking path. As used in this disclosure, "recording" is an act of measuring and recording with a certain level of precision a geographic location, area, or path along which an autonomous vehicle is intended to be driven. In some embodiments, aspects of the present invention may allow non-expert users to record a path and/or geographic locations associated with a path with a certain level of precision, without need for extensive training. As used in this disclosure, a "parking waypath" is at least an element of data that represents a parking path. In some cases, a parking waypath may include one or more waypoints representative of locations along the parking path. In some embodiments, second remote device 132 and locating sensor 136 may be configured to survey a pick-up geofence for pick-up location. As used in this disclosure, a "pick-up geofence" is at least an element of data that represents a positional boundary of a pick-up location to a certain level of precision. In some embodiments, second remote device 132 and locating sensor 136 may be configured to record a summoning waypath for summoning path. As used in this disclosure, a "summoning waypath" is at least an element of data that represents a summoning path. In some cases, a summoning waypath may include one or more waypoints representative of locations along summoning path. In some cases, survey data may include a task identifier. As used in this disclosure, a "task identifier" is at least an element of data that uniquely identifies a specific surveying process.

Still referring to FIG. 1, in some embodiments, computing device 104 may be further configured to generate parking map 108 for point of interest, wherein the parking map 108 includes at least a survey designator 116 and survey data 140. In some embodiments, survey data 140 may additionally include a surveyor identifier. As used in this disclosure, a "surveyor identifier" is at least an element of data that uniquely represents a surveyor, such that substantially one surveyor identifier represent one surveyor and one surveyor is represented by one surveyor identifier. Exemplary non-limiting user identifiers include usernames, codes, numbers, for example surveyor's license numbers and/or serial numbers, and the like. In some cases, a user identifier may include a surveyor identifier. In some cases, computing device 104 may be additionally configured to generate a surveyor metric associated with the survey identifier. As used in this disclosure, a "surveyor metric" is a quantifiable measure representative of a surveyor's suitability for a specific or general purpose. For example, in some cases, a surveyor metric may be representative of an aggregation of user feedback of one or more parking maps surveyed by a surveyor. Alternatively or additionally, in some cases, a surveyor metric may be representative of utilization of at least a parking map surveyed by a surveyor; for example, as a measure of how regularly the parking map is used. In some cases, a surveyor metric representing utilization of at least a parking map surveyed by a surveyor may be normalized and/or standardized according to statistical analysis methods and/or known traffic and/or global parking map utilization metrics. In some cases, a surveyor metric may be representative of number and/or proportion of autonomous parking failures and/or successes resulting from success of at least a parking map surveyed by a surveyor. In some cases, a surveyor metric may be determined according to analysis of a plurality of parking maps surveyed by the surveyor. For example, a surveyor metric may represent number of parking maps surveyed by surveyor. In some cases. a surveyor metric may be determined according validation statistics associated with one or more parking maps surveyed by surveyor. As used in this disclosure, "validation statistics" are statistical data, expressions, or analysis related to a validation process. For example, validation statistics may be determined for a given parking map and/or a plurality of parking map. Validation statistics may include number of validation errors and/or warning, mean validation errors and/or warnings, standard deviation of validation errors and/or warnings and the like. In some cases, a surveyor metric may be representative of an amount of value provided by a surveyor. For example, in some cases, users may value parking maps and generation of new parking maps may be valued by individual users and/or groups of users. In some embodiments, computing device 104 may additionally be configured to receive a user feedback associated with parking map 108 and update surveyor metric as a function of user feedback.

Still referring to FIG. 1, in some embodiments, computing device 104 may be additionally configured to validate parking map 108. As used in this disclosure, "validation" is a process of ensuring that which is being "validated" complies with stakeholder expectations and/or desires. Stakeholders may include users, administrators, point of interest stakeholders, drivers, surveyors, property managers, parking lot/garage staff, and the like. Very often a specification prescribes certain testable conditions (e.g., metrics) that codify relevant stakeholder expectations and/or desires. In some cases, validation includes comparing a product, for example survey data 140 and/or a parking map 108, against a specification. In some cases, computing device 104 may be additionally configured to validate a waypath by segmenting the waypath into a plurality of sub-waypaths and validating at least a sub-waypath of the plurality of sub-waypaths. As used in this disclosure, a "sub-waypath" is an element of a waypath that represents at least a portion of a path. In some cases, sub-waypath may include one or more waypoints along a path. In some embodiments, computing device 104 may be configured to validate any survey data, for example without limitation one or more of drop-off geofence, parking geofence, parking waypath, pick-up geofence, summoning waypath, and the like. In some cases, computing device 104 may validate parking map 108, for example prior to communicating the parking map 108 to first remote device 124. Alternatively or additionally, in some cases, some or all validation processes may be performed using a remote device, for example first remote device 124 and/or second remote device 132. In some cases, at least a machine-learning process, for example a machine-learning model, may be used to validate survey data by computing device 104. Computing device 104 may use any machine-learning process described in this disclosure for this or any other function.

Still referring to FIG. 1, in some embodiments, computing device 104 may be configured to receive site-specific driving rules associated with point of interest. In some cases, parking map 108 may include site-specific driving rules. As used in this disclosure, "site-specific driving rules" are local rules which govern an autonomous vehicle only at a specific point of interest; site-specific driving rules are in contrast to global driving rules which govern an autonomous vehicle at substantially all points of interest. In some cases, a user may input site-specific driving rules into computing device 104 directly or by way of another computing device in communication with the computing device 104. Alternatively and/or additionally, a remote device 124, 132 may communicate site-specific driving rules to computing device 104. In some cases, a user may input site-specific driving rules into remote device 124, 132.

Still referring to FIG. 1, in some embodiments, second remote device 132 may be configured to package survey data within a survey data structure. As used in this disclosure, a "survey data structure" is aggregated data that includes a plurality of data-types resulting from surveying a point of interest. In some cases, survey data structure may include one or more of drop-off geofence, parking geofence, parking waypath, pick-up geofence, and summoning waypath. In some cases, second remote device 132 may be configured to upload survey data structure to computing device 104. In some embodiments, computing device 104 may generate parking map 108 using survey data structure.

Still referring to FIG. 1, in some embodiments, second remote device 132 may be configured to verify survey data 140. As used in this disclosure, "verification" is a process of ensuring that which is being "verified" complies with certain constraints, for example without limitation system requirements, regulations, and the like. In some cases, verification may include comparing a product, e.g., survey data, against one or more acceptance criteria. For example, in some cases, a certain type of survey data 140 may be required to contain data of a certain type, size, information range. Ensuring that an individual instance of survey data is in compliance with acceptance criteria may, in some cases, constitutes verification. In some cases, second remote device 132 may verify survey data substantially before uploading survey data to computing device 104. In some cases, verification may include ensuring that survey data is complete, for example that all required survey data types, e.g., drop-off geofence 140 and the like, are present, readable, uncorrupted, and/or otherwise useful for map generation by computing device 104. In some cases, some or all verification processes may be performed by computing device 104. In some cases, at least a machine-learning process, for example a machine-learning model, may be used to verify survey data by second remote device 132. Second remote device 132 may use any machine-learning process described in this disclosure for this or any other function.

Figure 2:
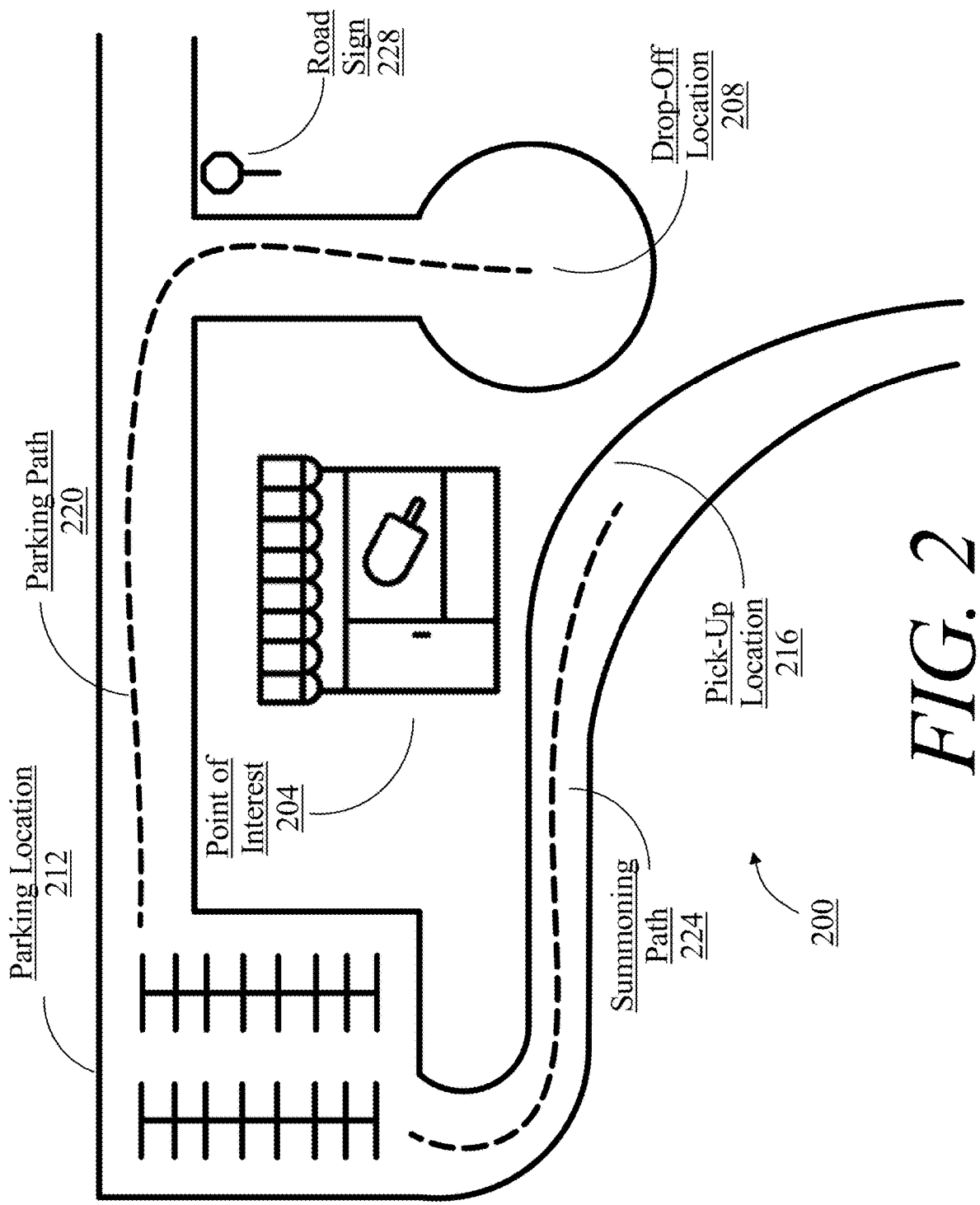
FIG. 2 illustrates an exemplary geographic region including a point of interest.

Referring now to FIG. 2, an exemplary geographic area 200 is illustrated with a point of interest 204. As described throughout, point of interest 204 may include any location which a person may be inclined to travel to (or from) by car (for at least a leg of the travel). Point of interest 204 as illustrated in FIG. 2, is depicted as a non-limiting exemplary ice-cream parlor. Point of interest 204 has associated with it a drop-off location 208, a parking location 212, and a pick-up location 216. In some cases, one or more of the above-mentioned locations may overlap and or include one another, for example drop-off location 208 and pick-up location 216 may include some or all of the same space. A parking path 220 may be located between drop-off location 208 and parking location 212. In some cases, parking path 220 is geographic path an autonomous vehicle will take to get from drop-off location 208 to parking location 212. A summoning path 224 may be located between parking location 212 and pick-up location 216. In some cases, summoning path 224 is a geographic path an autonomous vehicle will take to get from parking location 212 to pick-up location 216. A road sign 228 is shown substantially along parking path 220. Road sign 228 may include any road sign, including but not limited to regulatory signs, warning signs, guide signs (e.g., street name signs, route marker signs, expressway signs, freeway signs, welcome signs, informational signs, recreation and cultural interest signs, and the like), emergency management signs, temporary traffic control signs, school signs, railroad signs, and bicycle signs.

With continued reference to FIG. 2, in some embodiments, mapping of point of interest 204 may include surveying drop-off location 208, parking location 212, and/or pick-up location 216 to measure and record a drop-off geofence, a parking geofence, and/or a pick-up geofence. In some embodiments, mapping a point of interest 204 may additionally include recording parking path 220 and/or summoning path 224 to measure and/or record a parking waypath and/or a summoning waypath.

Figure 3:
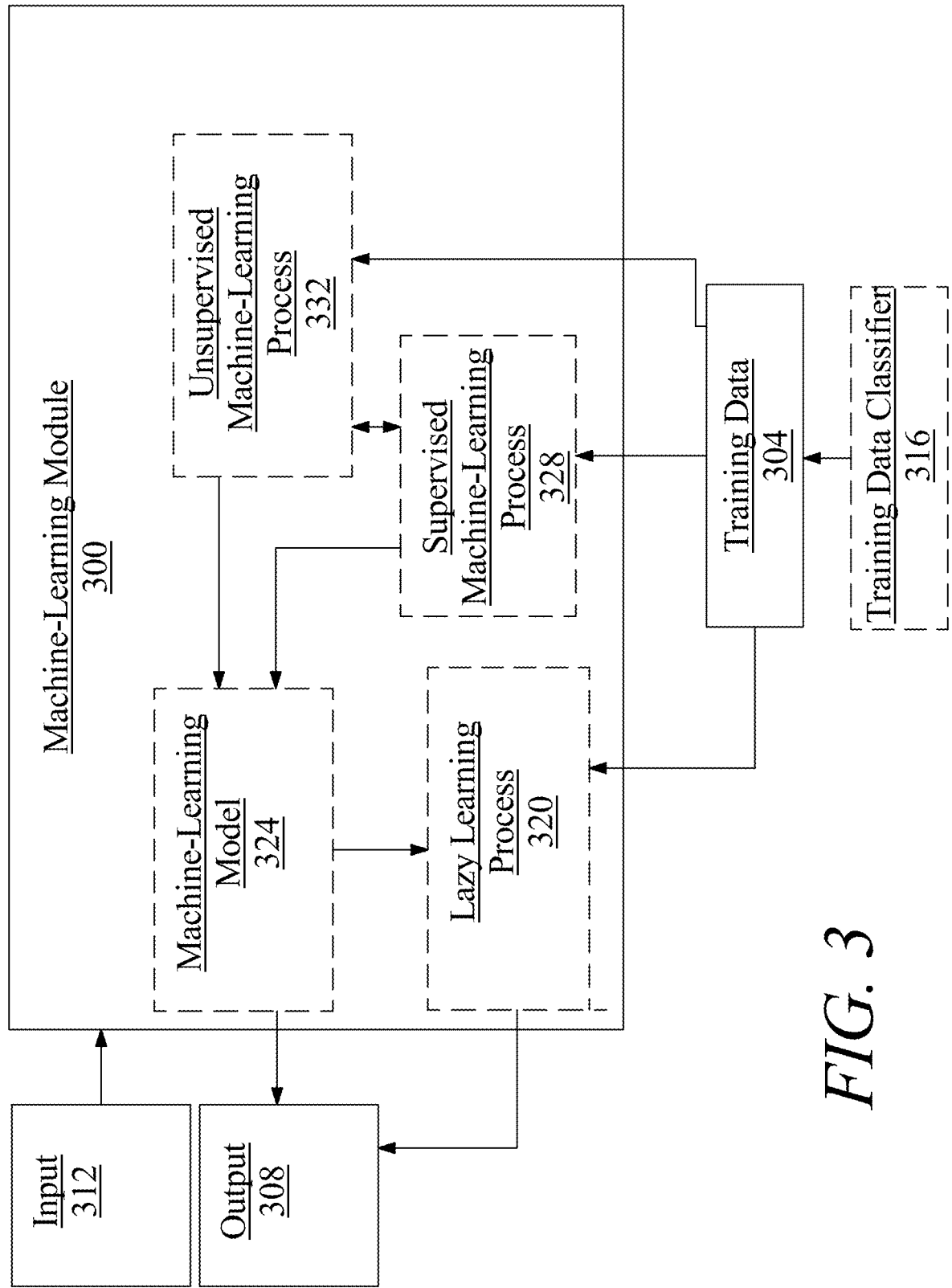
FIG. 3 is a block diagram illustrating an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include historical survey data and outputs may include a classification of survey data, for example "verified," "unverified," "validated," "unvalidated," "compliant," "non-compliant," and the like. As another non-limiting illustrative example inputs may include historical parking map usage statistics and outputs may include one or more data and/or data types represented by map metric 120. As yet another non-limiting illustrative example inputs may include historical parking map usage statistics and outputs may include one or more data and/or data types represented by surveyor metric. In some cases, training data may include inputs that include one or more parking maps 108 and outputs that include a map metric, 120. In some cases, training data may include inputs that include one or more parking maps 108 and outputs that include a surveyor metric.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classifications of survey data, for example "verified," "unverified," "validated," "unvalidated," "compliant," "non-compliant," and the like. In some cases, training data may be further classified, for example based upon, access datum, permission datum, point of interest type (e.g., municipal building, retail building, and the like), parking location type (e.g., parking garage, parking lot, on-street parking, and the like). In some cases, a point of interest may serve a commercial interest, for example a business having a fleet of vehicles, such as without limitation a shipping company, a transit company, a rental vehicle company, a police department, and the like. In some cases, point of interest may be substantially private and not used by general public, for example a private residence. In some cases, training data may be classified according to usage, large commercial usage compared to retail or consumer usage.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include parking maps 108 as described above as inputs, any of verification status, validation status, map metric 120, or surveyor metric as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
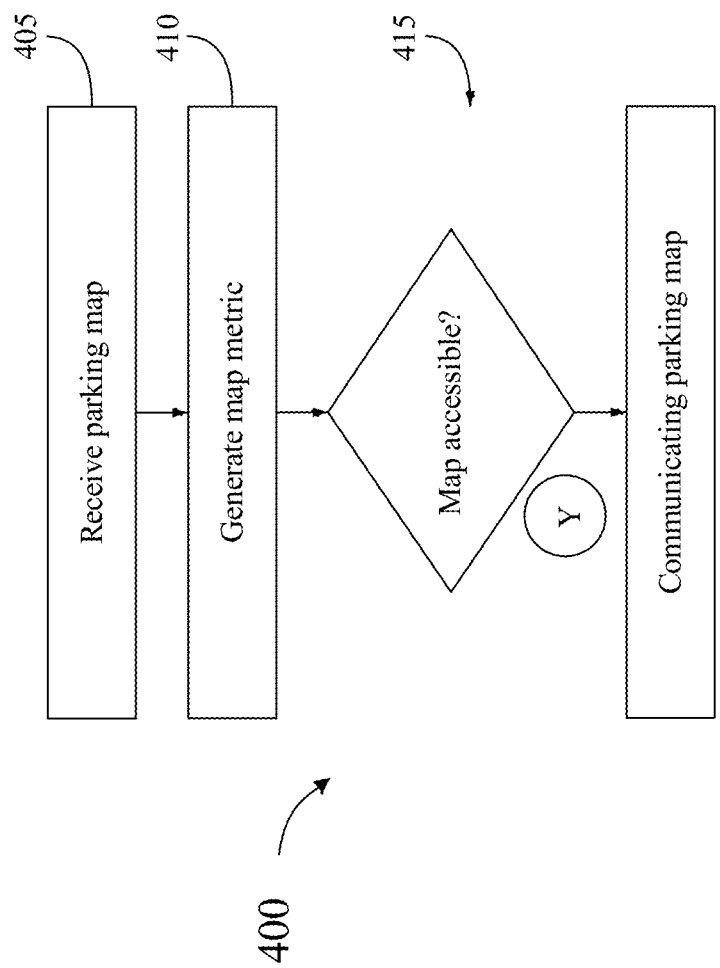
FIG. 4 is a flow diagram illustrating an exemplary method of controlling usage of parking maps for autonomous vehicles.

Referring now to FIG. 4, an exemplary method 400 of controlling usage of parking maps for autonomous parking is illustrated by way of a flow diagram. At step 405, method 400 includes receiving, using a computing device, a first parking map representative of a first point of interest. Computing device may include any computing device described in this disclosure, for example in reference to FIGS. 1-3 and 5. First parking map may include any parking map described in this disclosure, for example with reference to FIGS. 1-3. First point of interest may include any point of interest described in this disclosure, for example with reference to FIGS. 1-3. In some cases, first parking map may include a first access datum. First access datum may include any access datum described in this disclosure, for example with reference to FIGS. 1-3. In some embodiments, step 405 may additionally include receiving, using a computing device, at least a survey designator for first point of interest; surveying, using a second remote device having at least a locating sensor, the first point of interest, wherein surveying includes surveying at least a portion of the first point of interest, recording survey data for the first point of interest, uploading, using the second remote device, the survey data to the computing device, and generating, using the computing device, first parking map, wherein the first parking map comprises the at least a survey designator and the survey data. Survey designator may include any survey designator described in this disclosure, for example with reference to FIGS. 1-3. Survey data may include any survey data described in this disclosure, for example with reference to FIGS. 1-3. In some cases, survey data may additionally include a surveyor identifier. Surveyor identifier may include any surveyor identifier described in this disclosure, for example with reference to FIGS. 1-3. In some cases, method 400 may additionally include generating, using computing device, a surveyor metric associated with the survey identifier. Surveyor metric may include any surveyor metric described in this disclosure, for example with reference to FIGS. 1-3. In some cases, method 400 may additionally include receiving, using computing device, a user feedback associated with first parking map and updating, using the computing device, surveyor metric as a function of the user feedback. User feedback may include any user feedback described in this disclosure, for example with reference to FIGS. 1-3.

With continued reference to FIG. 4, at step 410, method 400 may include generating, using computing device, a first map metric associated with first parking map. First map metric may include any map metric described in this disclosure, for example with reference to FIGS. 1-3.

With continued reference to FIG. 4, at step 415, method 400 may include selectively communicating, using computing device, first parking map with a first remote device as a function of first access datum. First remote device may include any remote device and/or computing device described in this disclosure, for example with reference to FIGS. 1-3 and 5.

Still referring to FIG. 4, in some embodiments, method 400 may additionally include validating, using computing device, the first parking map. validating may include any validation process described in this disclosure, for example with reference to FIGS. 1-3.

Still referring to FIG. 4, in some embodiments, method 400 may additionally include receiving, using computing device, a second parking map representative of first point of interest, wherein the second parking map comprises a second access datum; generating, using the computing device, a second map metric associated with the second parking map; ranking, using the computing device, a parking map list including the first parking map and the second parking map as a function of the first map metric and the second map metric; and selectively communicating, using the computing device, one of the first parking map and the second parking map as a function of the parking map list. Parking map list may include any parking map list described in this disclosure, for example with reference to FIGS. 1-3.

Still referring to FIG. 4, in some embodiments, method 400 may additionally include receiving, using computing device, a user feedback associated with first parking map; and updating, using the computing device, first map metric as a function of the user feedback. User feedback may include any user feedback described in this disclosure, for example with reference to FIGS. 1-3.

Still referring to FIG. 4, in some embodiments, method 400 may additionally include communicating, using first remote device, a user identifier associated with a user of the first remote device to computing device; and authenticating, using the computing device, the user of the first remote device. User may include any user described in this disclosure, for example with reference to FIGS. 1-3. User identifier may include any user identifier described in this disclosure, for example with reference to FIGS. 1-3.

Still referring to FIG. 4, in some embodiments, method 400 may additionally include receiving, using computing device, a second parking map representative of first point of interest, wherein the second parking map comprises a second access datum; generating, using the computing device, a second map metric associated with the second parking map; and selectively communicating, using the computing device, one of the first parking map and the second parking map as a function of the first access datum, the second access datum and the user identifier.

Still referring to FIG. 4, in some embodiments, method 400 may additionally include storing, using computing device, first parking map on a map datastore. Map datastore may include any map datastore described in this disclosure, for example with reference to FIGS. 1-3. In some cases, map datastore may correspond to first access datum.

Still referring to FIG. 4, in some embodiments, method 400 may additionally include receiving, using computing device, a third parking map representative of a second point of interest and selectively communicating, using the computing device, the third parking map with first remote device as a function of a location of the first remote device. Location may include any location described in this disclosure, for example with reference to FIGS. 1-3.

Elements of the present disclosure may be further understood with reference to exemplary parameters and ranges within the table below. Ranges below are provided for exemplary purposes and are not intended to be limiting. In some cases, ranges may be theoretically limitless, and range boundaries provided below may represent practical limits for some exemplary embodiments.

|  | Min. | Nom. | Max. |
|---|---|---|---|
| No. Maps per Point of Interest (-) | 0-1 | 10 | >1,000,000 |
| No. users in with access to a map (-) | 0-1 (Private Map) | Variable (Shared or community Map) | >100,000,000 (Public Map) |
| Exemplary Accessibility | Public, private, and shared (e.g., access to more than one user, but fewer than all). | | |
| Parking Map Metric Criteria | Map usage statistics (e.g., proportion of successful uses of map), map ranking, user feedback associated with map, and the like. | | |
| Surveyor Map Metric Criteria | Value of survey(s), for example in U.S. Dollars, surveyor ranking, surveyor review, map usage statistics (e.g., proportion of successful uses of map), map ranking, user feedback associated with map, and the like. | | |
| Exemplary Locating Sensor | a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. | | |
| Exemplary Geofences | Drop-off geofence, pick-up geofence, parking geofence, and the like. | | |
| Exemplary Waypaths | Parking waypath, summoning waypath, and the like. | | |
| Exemplary Waypoints | Waypoints may be included in either geofences of waypath, also signage waypoints. | | |

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
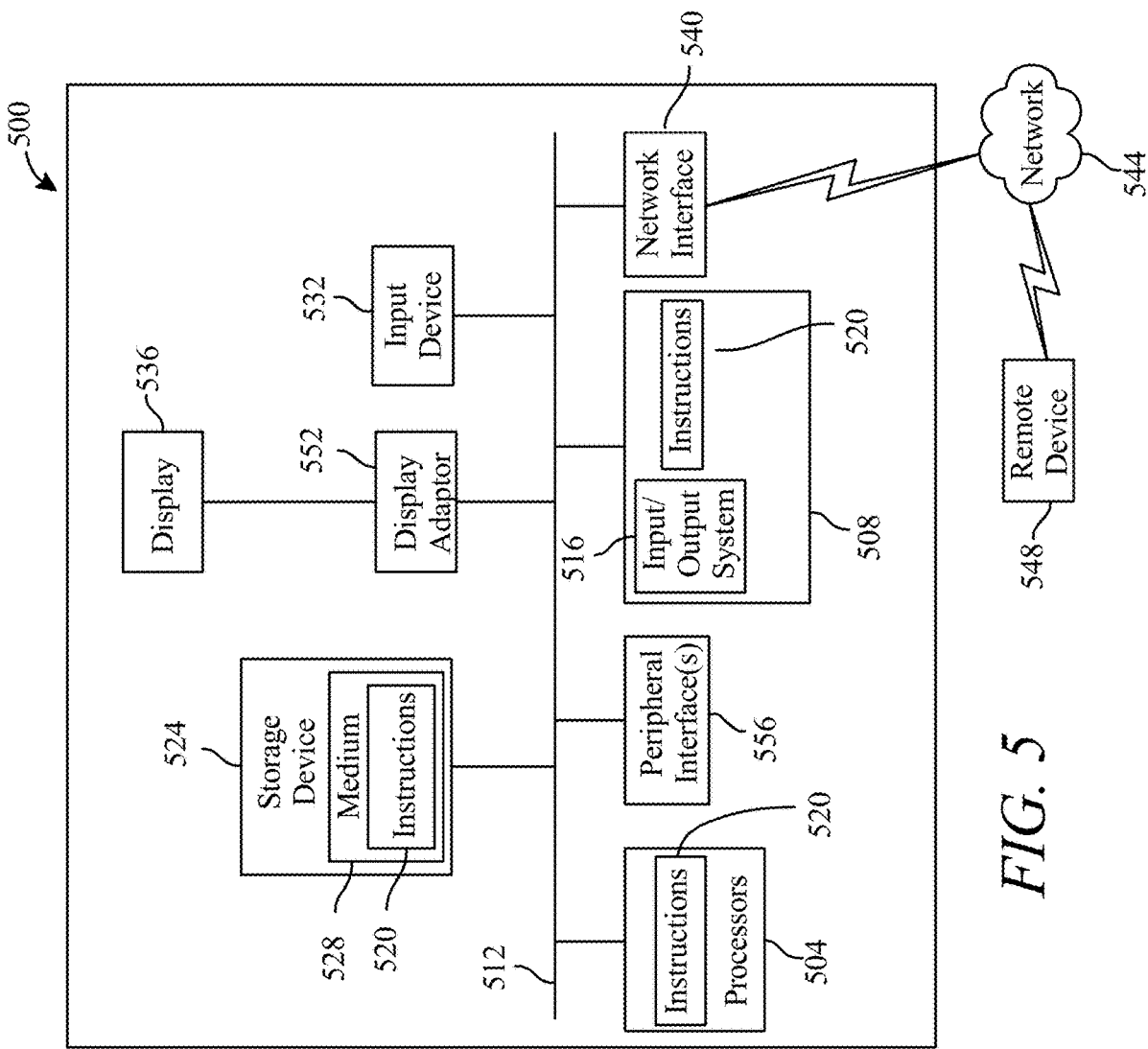
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of controlling usage of parking maps for autonomous parking, the method comprising:
   receiving, using a computing device, a first parking map representative of a first point of interest, wherein the first parking map comprises a first access datum;
   generating, using the computing device, a first map metric associated with the first parking map;
   receiving, using the computing device, a user feedback associated with the first parking map;
   generating, using the computing device, an updated first map metric as a function of the user feedback and a first machine-learning process, wherein generating the updated first map metric further comprises:
      training the first machine-learning process as a function of a first training data set, wherein the first training data set includes user feedback data correlated with map metric data, wherein the user feedback data includes categorization and scoring of processed elements of the user feedback data; and
      determining the updated first map metric using the first machine-learning process, wherein the first machine-learning process uses the user feedback as an input and outputs the updated first map metric;
   receiving, using the computing device, a second parking map representative of the first point of interest, wherein the second parking map comprises a second access datum;
   generating, using the computing device, a second map metric associated with the second parking map;
   ranking, using the computing device, a parking map list including the first parking map and the second parking map as a function of the updated first map metric, the second map metric and a second machine-learning process, wherein the second machine-learning process ranks the parking map list in combination with a statistical algorithm; and
   selectively communicating, using the computing device, one of the first parking map and the second parking map to a first remote device as a function of the parking map list.

2. The method of claim 1, further comprising validating, using the computing device, the first parking map.

3. The method of claim 1, further comprising:
   receiving, using the computing device, a user identifier associated with a user of the first remote device from the first remote device; and
   authenticating, using the computing device, the user of the first remote device.

4. The method of claim 3, further comprising:
   selectively communicating, using the computing device, one of the first parking map and the second parking map as a function of the first access datum, the second access datum and the user identifier.

5. The method of claim 1, further comprising storing, using the computing device, the first parking map on a map datastore, wherein the map datastore corresponds to the first access datum.

6. The method of claim 1, further comprising:
   receiving, using the computing device, a third parking map representative of a second point of interest; and
   selectively communicating, using the computing device, the third parking map with the first remote device as a function of a location of the first remote device.

7. The method of claim 1, wherein the first map metric comprises information representative of a proportion of successful autonomous parkings associated with usage of the first parking map.

8. The method of claim 1, wherein the method further comprises:
   receiving, using the computing device, a biometric identifier associated with a user of the first remote device from the first remote device; and
   authenticating, using the computing device, the user of the first remote device as a function of the biometric identifier.

9. A system for controlling usage of parking maps for autonomous parking, the system comprising a computing device, configured to:
   receive a first parking map representative of a first point of interest, wherein the first parking map comprises a first access datum;
   generate a first map metric associated with the first parking map;
   receive a user feedback associated with the first parking map;

generate an updated first map metric as a function of the user feedback and a first machine-learning process, wherein generating the updated first map metric further comprises:
  training the first machine-learning process as a function of a first training data set, wherein the first training data set includes user feedback data correlated with map metric data, wherein the user feedback data includes categorization and scoring of processed elements of the user feedback data; and
  determining the updated first map metric using the first machine-learning process, wherein the first machine-learning process uses the user feedback as an input and outputs the updated first map metric;
receive a second parking map representative of the first point of interest, wherein the second parking map comprises a second access datum;
generate a second map metric associated with the second parking map;
rank a parking map list including the first parking map and the second parking map as a function of the updated first map metric, the second map metric and a second machine-learning process, wherein the second machine-learning ranks the parking map list in combination with a statistical algorithm; and
selectively communicate one of the first parking map and the second parking map to a first remote device as a function of the parking map list.

10. The system of claim 9, wherein the computing device is further configured to validate the first parking map.

11. The system of claim 9, wherein the computing device is further configured to:
  receive a user identifier associated with a user of the first remote device from the first remote device; and
  authenticate the user of the first remote device.

12. The system of claim 11, wherein the computing device is further configured to:
  selectively communicate one of the first parking map and the second parking map as a function of the first access datum, the second access datum and the user identifier.

* * * * *